US009165451B1

(12) United States Patent
Wilson

(10) Patent No.: US 9,165,451 B1
(45) Date of Patent: Oct. 20, 2015

(54) ALARM ASSEMBLY

(71) Applicant: David Wilson, Tampa, FL (US)

(72) Inventor: David Wilson, Tampa, FL (US)

( * ) Notice: Subject to any disclaimer, the term of this patent is extended or adjusted under 35 U.S.C. 154(b) by 40 days.

(21) Appl. No.: 14/143,030

(22) Filed: Dec. 30, 2013

(51) Int. Cl.
*B60Q 1/00* (2006.01)
*G08B 21/02* (2006.01)

(52) U.S. Cl.
CPC .................................. *G08B 21/0205* (2013.01)

(58) Field of Classification Search
CPC .................. B60W 2040/0881; G08B 21/0202; G08B 21/0446; G08B 21/22; B60Q 1/00
USPC ................. 340/457, 667, 573.1, 539.23, 666, 340/686.1, 13.24; 180/271
See application file for complete search history.

(56) References Cited

U.S. PATENT DOCUMENTS 5,949,340 A * 9/1999 Rossi ......................... 340/573.1
D424,463 S 5/2000 Babers, Jr.
6,104,293 A 8/2000 Rossi
6,714,132 B2 3/2004 Edwards et al.
6,847,302 B2 1/2005 Flanagan et al.
6,922,147 B1 * 7/2005 Viksnins et al. ........... 340/573.1
6,924,742 B2 8/2005 Mesina
7,218,211 B2 5/2007 Ho et al.
7,348,880 B2 * 3/2008 Hules et al. ................... 340/522
7,408,445 B1 * 8/2008 Cunningham ............. 340/425.5
8,841,997 B2 * 9/2014 Silveira ....................... 340/457.1
8,970,362 B2 * 3/2015 Morley et al. ................. 340/457
2002/0161501 A1 * 10/2002 Dulin et al. ...................... 701/45
2003/0222775 A1 * 12/2003 Rackham et al. ............. 340/457
2004/0164856 A1 8/2004 Mesina
2012/0232749 A1 * 9/2012 Schoenberg et al. ........... 701/36

* cited by examiner

*Primary Examiner* — Phung Nguyen

(57) ABSTRACT

An alarm assembly includes a receiver that is positionable in a vehicle. The receiver emits an audible alarm if the temperature inside the vehicle exceeds a predetermined level when the vehicle is occupied. A temperature sensor is operationally coupled to the receiver. The temperature sensor senses ambient temperature of the receiver's environment so the receiver emits the audible alarm. An occupant sensor is operationally coupled to the receiver. The occupant sensor is positionable beneath a child seat in a vehicle to communicate occupancy of the vehicle to the receiver. A bracelet is operationally coupled to the receiver. The bracelet may be worn by a child inside the vehicle so the bracelet communicates occupancy of the vehicle to the receiver. A collar is operationally coupled to the receiver. The collar may be worn by a pet inside the vehicle so the collar communicates occupancy of the vehicle to the receiver.

14 Claims, 4 Drawing Sheets

ALARM ASSEMBLY

BACKGROUND OF THE DISCLOSURE

Field of the Disclosure

The disclosure relates to alarm devices and more particularly pertains to a new alarm device for notifying a user of an occupant left in a vehicle.

SUMMARY OF THE DISCLOSURE

An embodiment of the disclosure meets the needs presented above by generally comprising a receiver that is positionable within an interior of a vehicle. The receiver emits an audible alarm if the temperature inside the vehicle exceeds a predetermined level when the vehicle is occupied. A temperature sensor is operationally coupled to the receiver. The temperature sensor senses ambient temperature of the receiver's environment so the receiver emits the audible alarm. An occupant sensor is operationally coupled to the receiver. The occupant sensor is positionable beneath a child seat in a vehicle such that the occupant sensor senses weight so the occupant sensor communicates occupancy of the vehicle to the receiver. A bracelet is operationally coupled to the receiver. The bracelet is may be worn by a child inside the vehicle so the bracelet communicates occupancy of the vehicle to the receiver. A collar is operationally coupled to the receiver. The collar may be worn by a pet inside the vehicle so the collar communicates occupancy of the vehicle to the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
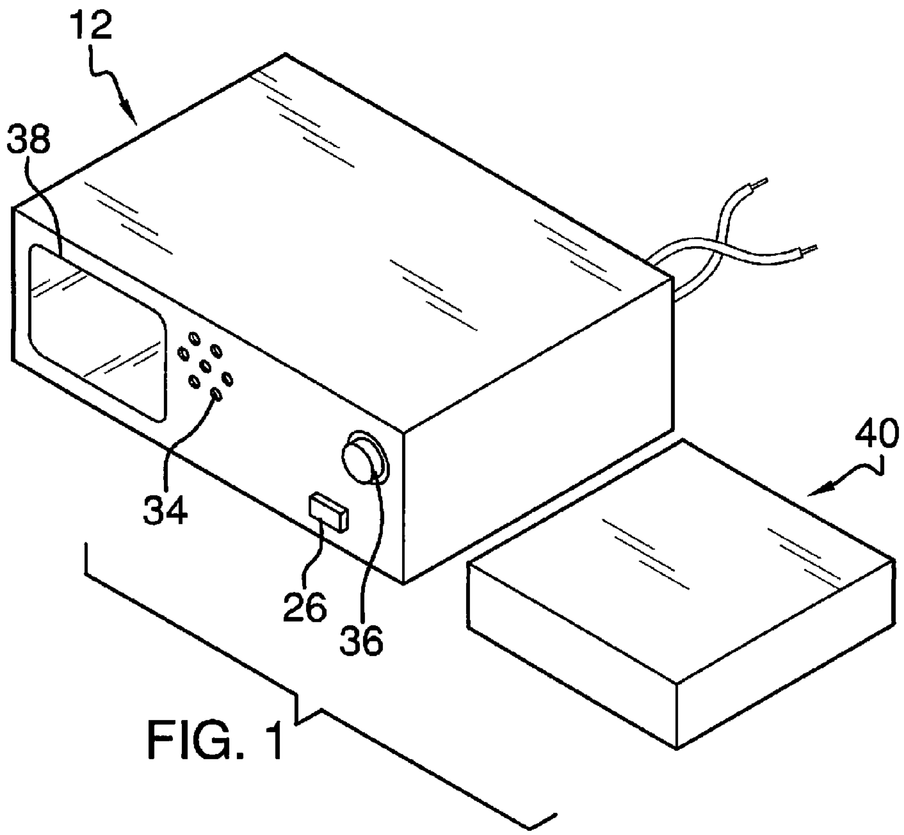
FIG. 1 is a perspective view of a alarm assembly according to an embodiment of the disclosure.
Figure 2:
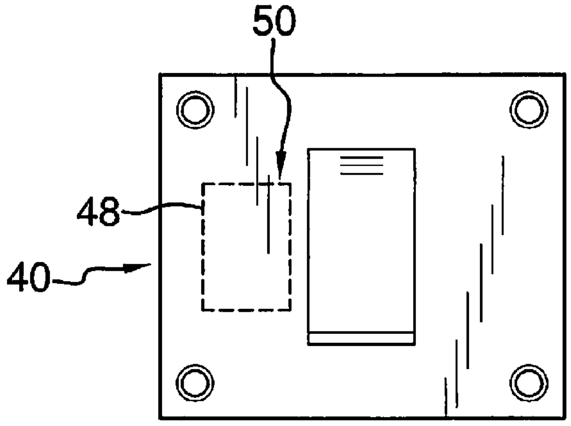
FIG. 2 is a bottom view of an embodiment of the disclosure.
Figure 3:
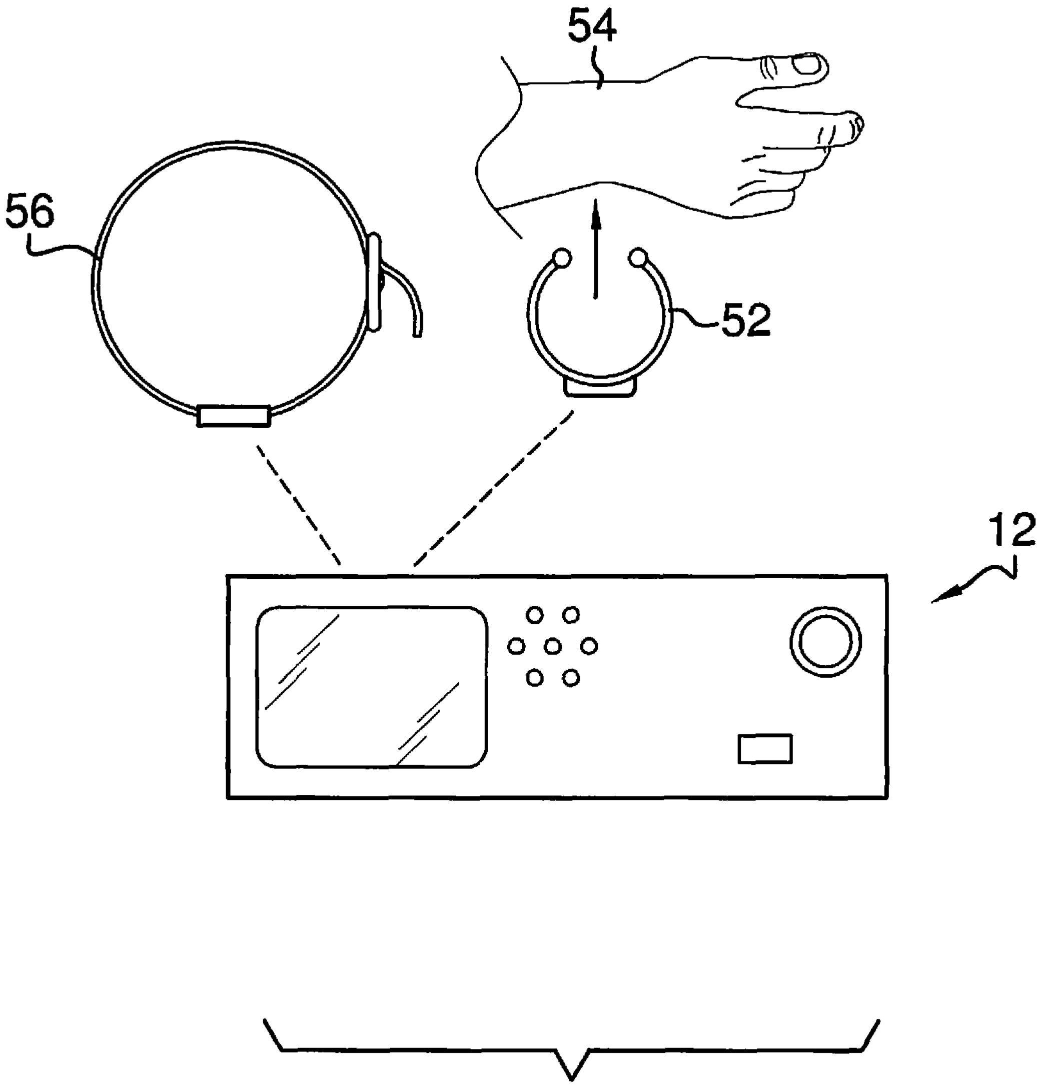
FIG. 3 is a front view of an embodiment of the disclosure.
Figure 4:
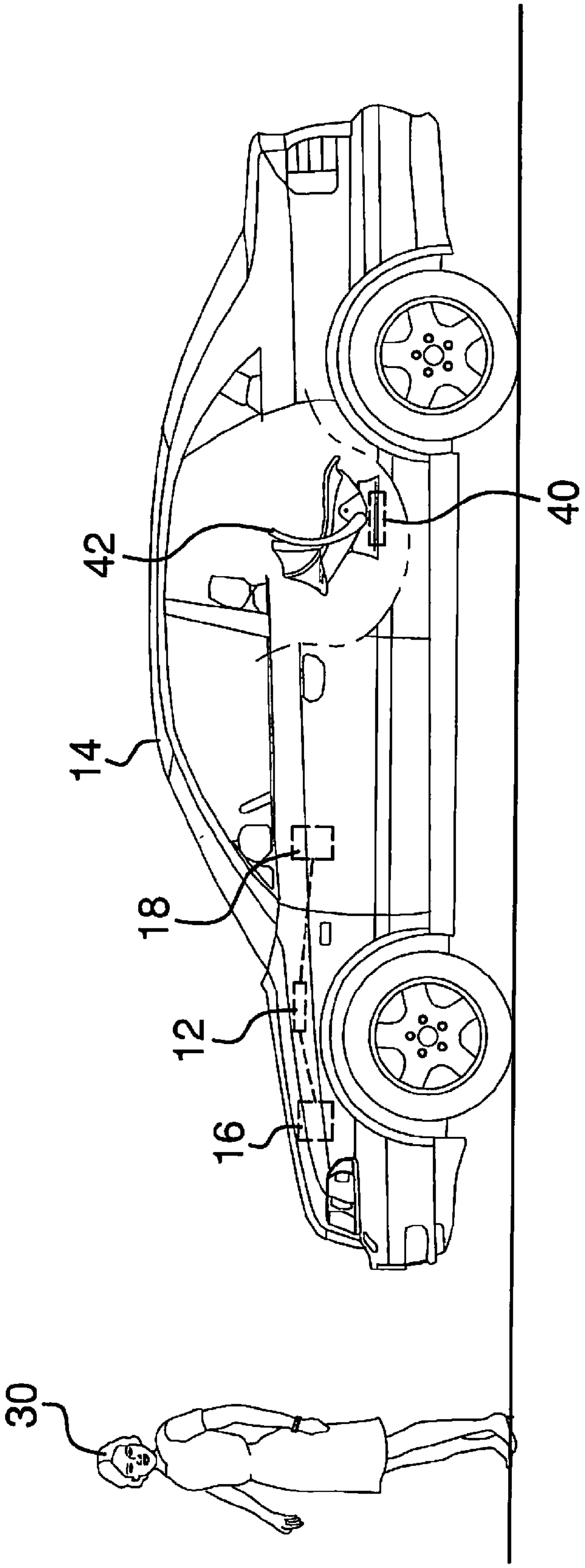
FIG. 4 is an in-use view of an embodiment of the disclosure.
Figure 5:
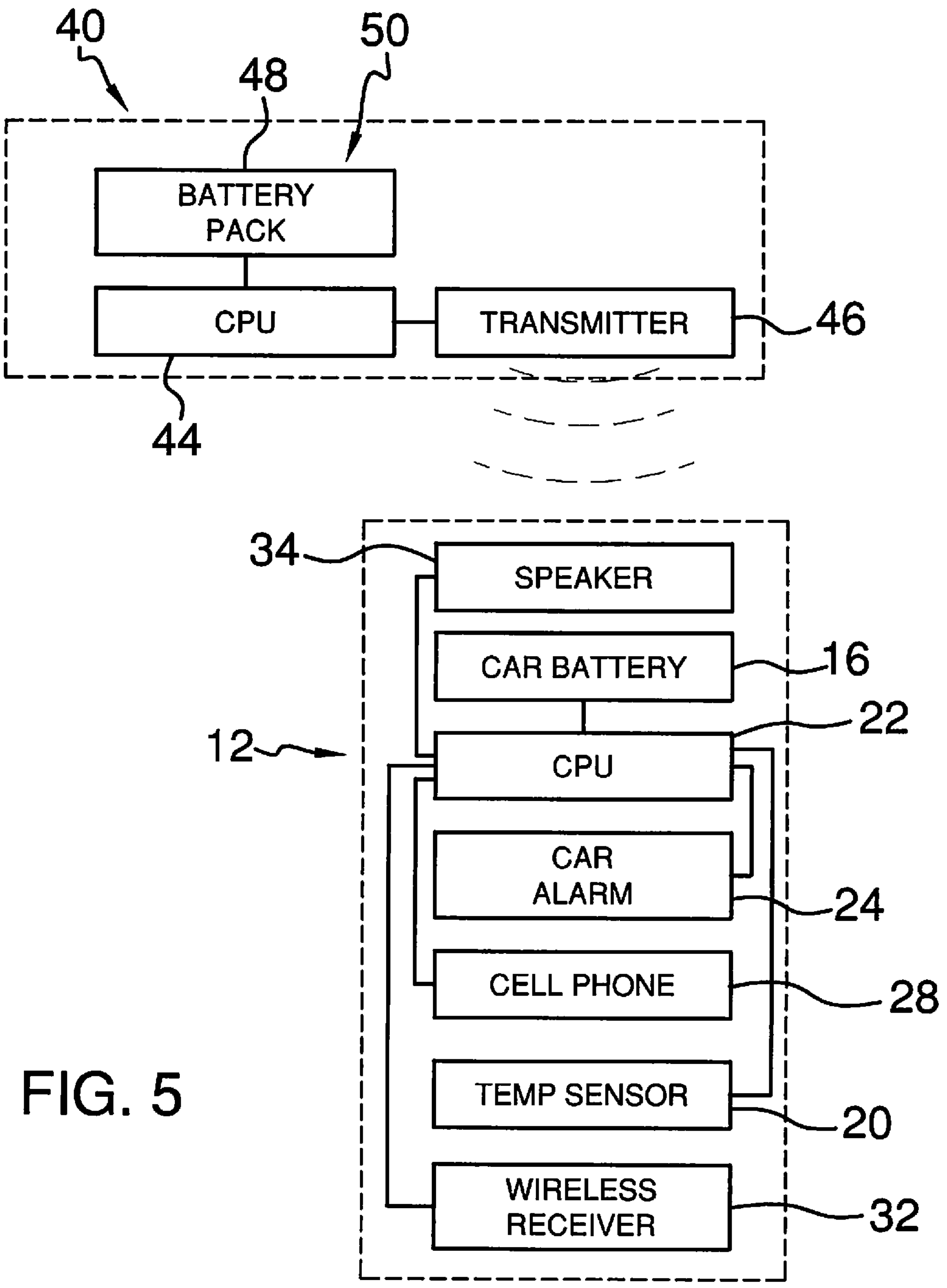
FIG. 5 is a schematic view of an embodiment of the disclosure.

With reference now to the drawings, and in particular to FIGS. 1 through 5 thereof, a new alarm device embodying the principles and concepts of an embodiment of the disclosure and generally designated by the reference numeral 10 will be described.

As best illustrated in FIGS. 1 through 5, the alarm assembly 10 generally comprises a receiver 12 that is positionable within an interior of a vehicle 14. The receiver 12 may also be placed in a room or other area to be observed. The receiver 12 is electrically coupled to a vehicle power source 16 so the receiver 12 is powered. The receiver 12 is in electrical communication with a vehicle ignition system 18 such that the receiver 12 senses when a key has been removed from the vehicle ignition system 18 so the ignition system 18 actuates the receiver 12 to detect occupancy. The receiver 12 emits an audible alarm if the temperature inside the vehicle 14 exceeds a predetermined level when the vehicle 14 is occupied.

A temperature sensor 20 is electrically coupled to the receiver 12. The temperature sensor 20 senses ambient temperature of the receiver's 12 environment so the receiver 12 emits the audible alarm if the temperature exceeds a predetermined level. A first processor 22 is coupled to the receiver 12 and is in electrical communication with the temperature sensor 20. The first processor 22 receives temperature data from the temperature sensor 20. The first processor 22 is in selective electrical communication with a theft alarm 24 in the vehicle 14 so the theft alarm 24 emits an audible alarm if the temperature sensor 20 communicates a temperature exceeding the predetermined level. A temperature actuator 26 is coupled to the receiver 12. The temperature actuator 26 is in electrical communication with the first processor 22. The temperature actuator 26 selects the predetermined maximum temperature.

The first processor 22 may be in selective electromagnetic communication with a user's cellular phone 28 so the cellular phone 28 alerts the user 30 if the temperature sensor 20 communicates a temperature exceeding the predetermined level to the first processor 22. The first processor 22 includes a wireless receiver 32. The wireless receiver 32 may be an RF wireless receiver. The wireless receiver 32 may have an operational frequency between 2400 MHz and 2480 MHz. The wireless receiver 32 is in electrical communication with the first processor 22. The wireless receiver 32 receives radio frequency transmission.

A speaker 34 is coupled to the receiver 12. The speaker 34 is in electrical communication with the first processor 22. The speaker 34 emits an audible alarm if the temperature sensor 20 detects a temperature exceeding the predetermined level. An actuator 36 is coupled to the receiver 12. The actuator 36 is in electrical communication with the first processor 22 and the temperature sensor 20. The actuator 36 selectively actuates and de-actuates the first processor 22 and the temperature sensor 20. A temperature indicator 38 is coupled to the receiver 12. The temperature indicator 38 is in electrical communication with the first processor 22. The temperature indicator 38 illuminates when the first processor 22 detects an excessive temperature. The temperature indicator 38 may be an LED.

An occupant sensor 40 is in electrical communication with the receiver 12. The occupant 40 sensor is positionable beneath a child seat 42 in a vehicle 14 such that the occupant sensor 40 senses weight so the occupant sensor 40 communicates occupancy of the vehicle to the receiver 12. The occupant sensor 40 may have a sensitivity range between 4.5 kg and 32 kg. A second processor 44 coupled to the occupant sensor 40. The second processor 44 is in electrical communication with the occupant sensor 40 so the occupant sensor 40 communicates occupancy to the second processor 44.

The second processor 44 includes a wireless transmitter 46. The wireless transmitter 46 may be an RF wireless transmitter. The wireless transmitter 46 may have an operational frequency between 2400 MHz and 2480 MHz. The wireless transmitter 46 is in electrical communication with the second processor 44 so the wireless transmitter 46 receives occupancy notification from the second processor 44. The wireless transmitter 46 is in electromagnetic communication with the wireless receiver 32 so the first processor 22 is actuated when the second processor 44 receiver occupancy notification. The first processor 22 is de-actuated when the second processor 44 does not receive occupancy notification. The first processor 22 will not trigger the audible alarm if the second processor 44 does not receive occupancy notification.

A power supply 48 is coupled to the occupant sensor 40. The power supply 48 is in electrical communication with the second processor 44. The power supply 48 comprises at least one battery 50. A bracelet 52 is in electromagnetic communication with the wireless receiver 32. The bracelet 52 may be worn on a child's wrist 54. The bracelet 52 notifies the receiver 12 of an occupant in the vehicle 14 if the occupant is not seated in the child seat 42 so the receiver 12 generates an audible alarm is the temperature in the vehicle exceeds the predetermined level. The bracelet 52 serves to communicate occupancy to the first processor 22 in addition to the occupant sensor 40. A collar 56 is in electromagnetic communication with the wireless receiver 32. The collar 56 notifies the receiver 12 of a pet in the vehicle 14 so the receiver 12 generates an audible alarm if the temperature in the vehicle 14 exceeds the predetermined level.

In use, the assembly 10 may be used to notify the user 30 if an occupant has been left in a vehicle 14 and is in danger of exposure to extreme temperatures. The receiver 12 may be used in any location to alert the user 30 if an occupant is in proximity to the receiver 12. The receiver 12 may be placed in communication with the user's cell phone 28 so the user 30 is notified when the temperature in the vehicle 14 becomes dangerous. The receiver 12 may actuate the theft alarm 24 in the vehicle 14 so that only the user 30 may deactivate the alarm. The theft alarm 24 in the vehicle 14 may alert bystanders of a potential danger to an occupant in the event that the user 30 cannot be notified or contacted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An alarm assembly configured to detect extreme temperature changes, said assembly comprising:

a receiver being positionable within an interior of a vehicle, said receiver emitting an audible alarm if the temperature inside the vehicle exceeds a predetermined level when the vehicle is occupied;

a temperature sensor operationally coupled to said receiver, said temperature sensor sensing ambient temperature of the receiver's environment whereby said receiver emits the audible alarm;

an occupant sensor operationally coupled to said receiver, said occupant sensor being positionable beneath a child seat in a vehicle such that said occupant sensor senses weight whereby said occupant sensor communicates occupancy of the vehicle to said receiver;

a bracelet operationally coupled to said receiver, said bracelet being configured to be worn by a child inside the vehicle whereby said bracelet communicates occupancy of the vehicle to said receiver; and a collar operationally coupled to said receiver, said collar being configured to be worn by a pet inside the vehicle whereby said collar communicates occupancy of the vehicle to said receiver;

a first processor coupled to said receiver and being in electrical communication with said temperature sensor, said first processor receiving temperature data from said temperature sensor; and an actuator being coupled to said receiver, said actuator being in electrical communication with said first processor and said temperature sensor, said actuator selectively actuating and de-actuating said first processor and said temperature sensor.

2. The assembly according to claim 1, further including said receiver being in electrical communication with a vehicle ignition system such that said receiver senses when a key has been removed from the vehicle ignition system whereby said ignition system actuates said receiver to detect occupancy.

3. The assembly according to claim 1, further including said first processor including a wireless receiver, said wireless receiver being in electrical communication with said first processor, said wireless receiver receiving radio frequency transmission.

4. The assembly according to claim 1, further including said first processor being in selective electrical communication with a theft alarm in the vehicle whereby said theft alarm emits an audible alarm if said temperature sensor communicates a temperature exceeding the predetermined level to said first processor.

5. The assembly according to claim 1, further including said first processor being in selective electromagnetic communication with a user's cellular phone whereby said cellular phone alerts the user if said temperature sensor communicates a temperature exceeding the predetermined level to said first processor.

6. The assembly according to claim 1, further including a speaker coupled to said receiver, said speaker being in electrical communication with said first processor, said speaker emitting an audible alarm if said temperature sensor detects a temperature exceeding the predetermined level.

7. The assembly according to claim 1, further including said receiver being electrically coupled to a vehicle power source whereby said receiver is powered.

8. The assembly according to claim 1, further including said occupant sensor being in electrical communication with said receiver.

9. The assembly according to claim 1, further including a second processor coupled to said occupant sensor, said second processor being in electrical communication with said occupant sensor whereby said occupant sensor communicates occupancy to said second processor.

10. The assembly according to claim 1, further including a power supply coupled to said occupant sensor, said power supply being in electrical communication with said second processor, said power supply comprising at least one battery.

11. The assembly according to claim 1, further including:

said first processor including a wireless receiver;

said bracelet being in electromagnetic communication with said wireless receiver such that said bracelet notifies said receiver of an occupant in the vehicle if the occupant is not seated in the child seat whereby said receiver generates an audible alarm if the temperature in the vehicle exceeds the predetermined level.

12. The assembly according to claim 1, further including:
said first processor including a wireless receiver;
said collar being in electromagnetic communication with said wireless receiver such that said collar notifies said receiver of a pet in the vehicle whereby said receiver generates an audible alarm if the temperature in the vehicle exceeds the predetermined level.

13. An alarm assembly configured to detect extreme temperature changes, said assembly comprising:
a receiver being positionable within an interior of a vehicle, said receiver emitting an audible alarm if the temperature inside the vehicle exceeds a predetermined level when the vehicle is occupied;
a temperature sensor operationally coupled to said receiver, said temperature sensor sensing ambient temperature of the receiver's environment whereby said receiver emits the audible alarm;
an occupant sensor operationally coupled to said receiver, said occupant sensor being positionable beneath a child seat in a vehicle such that said occupant sensor senses weight whereby said occupant sensor communicates occupancy of the vehicle to said receiver;
a bracelet operationally coupled to said receiver, said bracelet being configured to be worn by a child inside the vehicle whereby said bracelet communicates occupancy of the vehicle to said receiver; and
a collar operationally coupled to said receiver, said collar being configured to be worn by a pet inside the vehicle whereby said collar communicates occupancy of the vehicle to said receiver;
a second processor coupled to said occupant sensor, said second processor being in electrical communication with said occupant sensor whereby said occupant sensor communicates occupancy to said second processor;
said first processor including a wireless receiver; and
said second processor including a wireless transmitter, said wireless transmitter being in electrical communication with said second processor whereby said wireless transmitter receives occupancy notification from said second processor, said wireless transmitter being in electromagnetic communication with said wireless receiver whereby said first processor is actuated when said second processor receiver occupancy notification and said first processor is de-actuated when said second processor does not receive occupancy notification.

14. An alarm assembly configured to detect extreme temperature changes, said assembly comprising:
a receiver being positionable within an interior of a vehicle, said receiver being electrically coupled to a vehicle power source whereby said receiver is powered, said receiver being in electrical communication with a vehicle ignition system such that said receiver senses when a key has been removed from the vehicle ignition system whereby said ignition system actuates said receiver to detect occupancy, said receiver emitting an audible alarm if the temperature inside the vehicle exceeds a predetermined level when the vehicle is occupied;
a temperature sensor operationally coupled to said receiver, said temperature sensor sensing ambient temperature of the receiver's environment whereby said receiver emits the audible alarm;
a first processor coupled to said receiver and being in electrical communication with said temperature sensor, said first processor receiving temperature data from said temperature sensor, said first processor being in selective electrical communication with a theft alarm in the vehicle whereby said theft alarm emits an audible alarm if said temperature sensor communicates a temperature exceeding the predetermined level to said first processor, said first processor being in selective electromagnetic communication with a user's cellular phone whereby said cellular phone alerts the user if said temperature sensor communicates a temperature exceeding the predetermined level to said first processor, said first processor including;
a wireless receiver, said wireless receiver being in electrical communication with said first processor, said wireless receiver receiving radio frequency transmission;
a speaker coupled to said receiver, said speaker being in electrical communication with said first processor, said speaker emitting an audible alarm if said temperature sensor detects a temperature exceeding the predetermined level;
an actuator being coupled to said receiver, said actuator being in electrical communication with said first processor and said temperature sensor, said actuator selectively actuating and de-actuating said first processor and said temperature sensor;
an occupant sensor being in electrical communication with said receiver, said occupant sensor being positionable beneath a child seat in a vehicle such that said occupant sensor senses weight whereby said occupant sensor communicates occupancy of the vehicle to said receiver;
a second processor coupled to said occupant sensor, said second processor being in electrical communication with said occupant sensor whereby said occupant sensor communicates occupancy to said second processor, said second processor including;
a wireless transmitter, said wireless transmitter being in electrical communication with said second processor whereby said wireless transmitter receives occupancy notification from said second processor, said wireless transmitter being in electromagnetic communication with said wireless receiver whereby said first processor is actuated when said second processor receiver occupancy notification and said first processor is de-actuated when said second processor does not receive occupancy notification;
a power supply coupled to said occupant sensor, said power supply being in electrical communication with said second processor, said power supply comprising at least one battery;
a bracelet being in electromagnetic communication with said wireless receiver such that said bracelet notifies said receiver of an occupant in the vehicle if the occupant is not seated in the child seat whereby said receiver generates an audible alarm if the temperature in the vehicle exceeds the predetermined level; and
a collar being in electromagnetic communication with said wireless receiver such that said collar notifies said receiver of a pet in the vehicle whereby said receiver generates an audible alarm if the temperature in the vehicle exceeds the predetermined level.

* * * * *